United States Patent [19]
MacDonald

[11] 3,877,411
[45] Apr. 15, 1975

[54] TEMPERATURE INDICATOR BOLTS

[75] Inventor: John A. MacDonald, Beaconsfield, Quebec, Canada

[73] Assignee: Railtech Ltd., Dorval, Quebec, Canada

[22] Filed: Jan. 2, 1974

[21] Appl. No.: 429,932

[30] Foreign Application Priority Data
July 16, 1973 United Kingdom............... 33783/73

[52] U.S. Cl. ................. 116/114.5; 116/114; 73/356
[51] Int. Cl. ......................... G01k 1/02; G01k 11/12
[58] Field of Search .... 116/101, 114 V, 106, 114.5; 73/356

[56] References Cited
UNITED STATES PATENTS

| | | | |
|---|---|---|---|
| 2,222,067 | 11/1940 | Chaney et al. | 116/114.5 X |
| 2,694,997 | 11/1954 | Alger, Jr. | 116/106 |
| 2,889,799 | 6/1959 | Korpman | 116/114 V |
| 3,442,249 | 5/1969 | Jamison et al. | 116/114.5 |
| 3,651,695 | 3/1972 | Brown | 116/114 V X |

FOREIGN PATENTS OR APPLICATIONS
1,029,605  5/1966  United Kingdom................... 73/356

OTHER PUBLICATIONS
Publication – "Temp-plate" – Apr. 4, 1966.
Publication – Devices and Systems at Work – Dated June 1970 – Page 52.

*Primary Examiner*—Richard C. Queisser
*Assistant Examiner*—John S. Appleman

[57] ABSTRACT

A temperature indicator bolt comprising a securable shank and an engageable head having an outer surface. A cavity is provided in the outer surface and contains a wafer type indicator element therein. The indicator element is impregnated, at least partly, with a chemical substance having indicating properties responsive to temperature. A transparent protective covering is provided over said wafer type indicator.

5 Claims, 4 Drawing Figures

3,877,411

TEMPERATURE INDICATOR BOLTS

BACKGROUND OF INVENTION a. Field of the Invention

The present invention relates to temperature indicator bolts and more particularly, but not exclusively, to such bolts for use in a journal roller bearing for railroad rolling stock.

b. Description of Prior Art

Heretofore, one method and apparatus for sensing overheated railway roller bearings is to put what is known as a "stink bomb" in a cavity of the bearing housing. When the bearing overheats the bomb explodes and releases the stink.

Another is to drill a hole in the bolt and to fill it with a temperature-sensitive wax. When it reaches the danger temperature, the wax heats and runs out of the hole.

Another type of signal device is disclosed in the U.S. Pat. No. 2,694,997, issued Nov. 23, 1954 and assigned to the New York Air Brake Company. The device consists of a mounting assembly which is adapted to be secured within a hole bored in a journal specifically to receive the device. A fusible wafer is held in the device and melts when the journal reaches a predetermined temperature. The melting of the wafer exposes an outer boss or stains the hub of a wheel to provide indication of the journal temperature. It can thus be seen that this device requires the boring of a special hole in the journal for installation, is comprised of a plurality of parts and therefore time-consuming to install and service and expensive to produce.

SUMMARY OF THE INVENTION

It is a feature of the present invention to provide a temperature indicator bolt which substantially overcomes the above-mentioned disadvantages.

Accordingly, from a broad aspect, the present invention provides a temperature indicator bolt for use in an end cap of a roller bearing mounting on an axle, said bolt comprising a securable shank and an engageable head having an outer surface; a shallow depression in a substantial portion of the surface area of said outer surface; a wafer type indicator element retained in said shallow depression; said indicator element being provided with at least two sections, one of said sections being responsive to a predetermined overheating temperature and the other to another predetermined temperature lower than said overheating temperature; each said sections being impregnated, at least partly, with a chemical substance having indicating properties responsive to said predetermined temperature of said section whereby the color of said substance will change and remain changed when said bolt is subjected to said predetermined temperature, and a transparent protective covering over said wafer type indicator to removably secure said indicator element in said shallow depression.

A preferred embodiment of the present invention will now be described with reference to the accompanying drawings in which.

DESCRIPTION OF PREFERRED EMBODIMENTS

Figure 1:
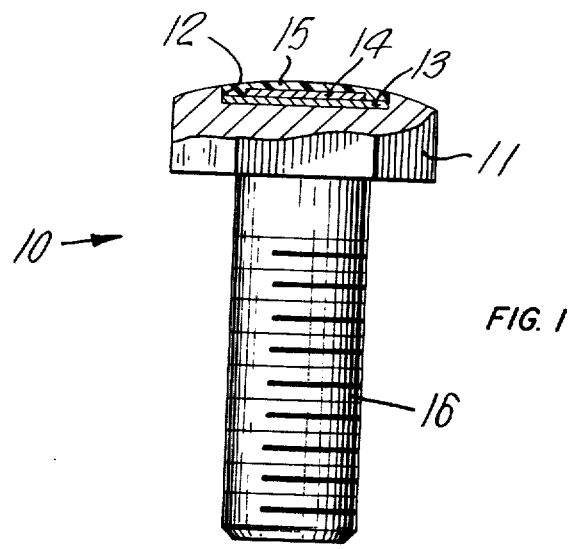
FIG. 1 is a side view of a temperature indicator bolt constructed in accordance with the present invention.
Figure 2:
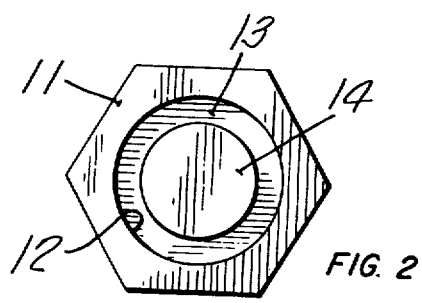
FIGS. 2 and 3 are top views.

Referring to the drawings and more particularly to FIGS. 1 and 2, there is shown generally at 10 the temperature indicator bolt of the present invention. The bolt 10 consists of a threaded shank 16 and a head 11 having an indicator 17 on the upper face thereof. The head 11 of the bolt 10 is provided with a cylindrical recess 12 about one-sixteenth inch in depth. Within this recess 12 there is placed a colored backing element or disc 13. In this embodiment, the disc 13 is made of paper. On top of the disc 13 is a smaller disc 14, adhesively secured, of paper or other sheet material impregnated with a chemical substance which has the capacity of changing color at a given temperature. Such substances are in the form of a paint and are well known in the art. A plastic film surface 15 is adhesively secured over the discs 13 and 14, to seal them on the head 11 in the recess 12 and to permit visual access to the discs.

The disc 14 may be calibrated for different temperatures by using different heat-sensitive paints as is well known in the art.

The disc 13 forms a yellow perimeter, as shown in FIG. 2. The yellow background makes the silver color of disc 14 stand out, so it is easily visible.

Figure 3:
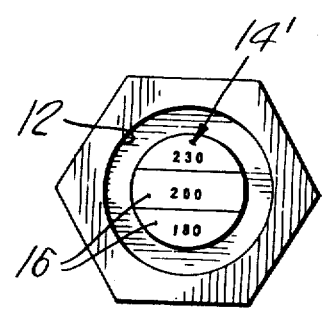

Referring now to FIG. 3, there is shown a further embodiment of the invention. Hereinshown, the disc portion 14' is constituted by two or more sections or strips 16 of material impregnated with a heat sensitive substance and each being responsive to a different temperature. The specific temperatures to which the strips are responsive are printed thereon. The strips in this embodiment are responsive to 180°F, 200°F and 230°F, respectively. The temperature markings are not affected by the discoloration of the strips. A plastic film 15 or plastic disc may be provided over the strips to retain them in a similar manner as disclosed above relative to FIGS. 1 and 2. Also, the colored backing disc 13 may be provided.

Figure 4:
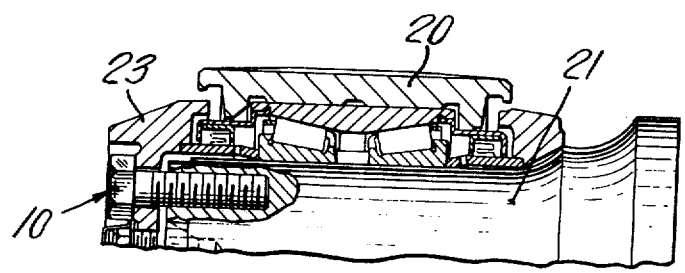
FIG. 4 is a side view, partly sectioned, of a journal roller bearing for railroad rolling stock incorporating temperature indicator bolts of the present invention.

The temperature indicator bolts 10 may be used as a temperature checker for journal roller bearings 20 on railroad rolling stock, as shown in FIG. 4. One of the bolts utilized to secure the end cap 23 has a temperature indicator, as disclosed above, applied to its face so that if the journal 21 is overheated the indicator disc 14 or strips 16 will be discolored due to the heating of the bolt 10 being in direct contact with the journal 21. Thus, there is provided an indication that the bearing has overheated during use.

I claim:

1. A temperature indicator bolt for use in an end cap of a roller bearing mounting on an axle, said bolt comprising a securable shank and an engageable head having an outer surface; a shallow depression in a substantial portion of the surface area of said outer surface; a wafer type indicator element retained in said shallow depression; said indicator element being provided with at least two sections, one of said sections being responsive to a predetermined overheating temperature and the other to another predetermined temperature lower than said overheating temperature; each said sections being impregnated, at least partly, with a chemical substance having indicating properties responsive to said predetermined temperature of said section whereby the color of said substance will change and remain changed when said bolt is subjected to said predetermined temperature, and a transparent protective covering over said wafer type indicator to removably secure said indicator element in said shallow depression.

2. A temperature indicator bolt as claimed in claim 1 wherein said wafer type indicator element is adhesively secured to a backing element having a different color whereby to constitute said peripheral band about said indicator element to more readily identify said indicator element.

3. A temperature indicator bolt as claimed in claim 1 wherein said sections are each provided with a marking indicating the temperature to which the chemical substance of the section is responsive.

4. A temperature indicator bolt as claimed in claim 1 wherein said transparent protective covering is a plastic film adhesively secured over said indicator element and entirely sealing said cavity.

5. A temperature indicator bolt as claimed in claim 1 wherein a peripheral band is provided about said indicator element and of a contrasting color to said indicator element when it has been subjected to a change of color due to overheating when said predetermined temperature is reached.

* * * * *